C. F. & W. C. ANDERSON.
COFFEE PERCOLATOR.
APPLICATION FILED JUNE 4, 1913.
1,130,131.
Patented Mar. 2, 1915.
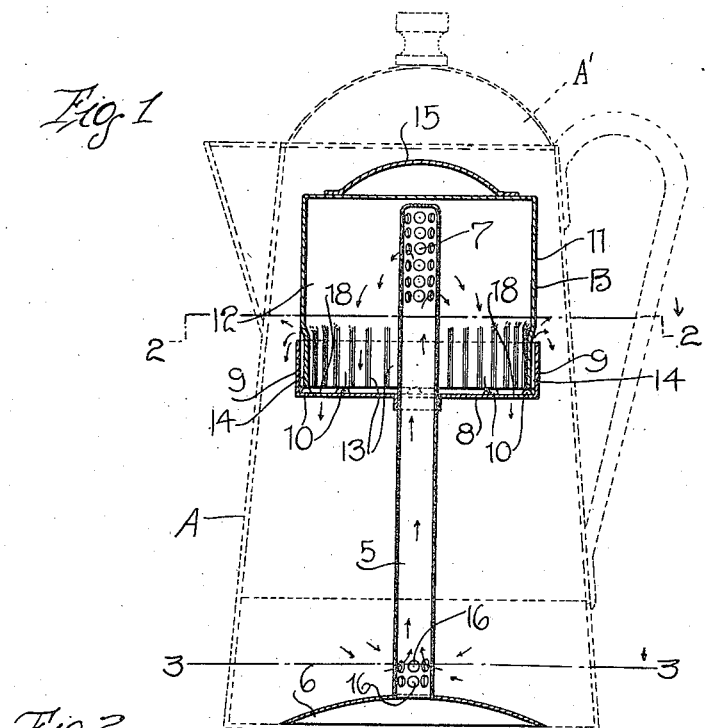
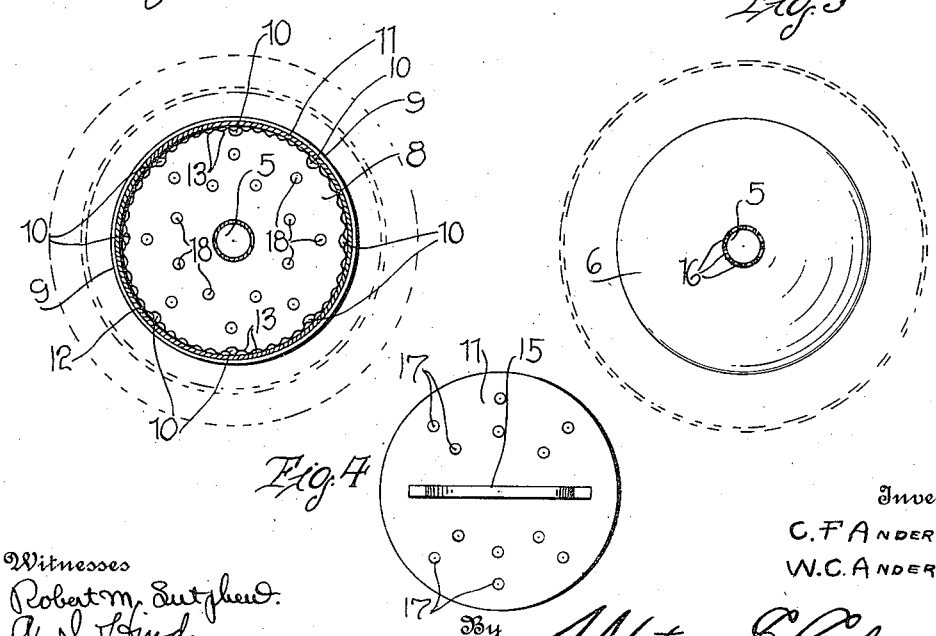
Witnesses
Robert M. Sutphend.
A. L. Hind.
Inventors
C. F. Anderson
W. C. Anderson
By Watson E. Coleman
Attorney

UNITED STATES PATENT OFFICE.

CLOYD F. ANDERSON AND WILLIAM C. ANDERSON, OF DENVER, COLORADO.

COFFEE-PERCOLATOR.

1,130,131.        Specification of Letters Patent.        Patented Mar. 2, 1915.

Application filed June 4, 1913. Serial No. 771,726.

*To all whom it may concern:*

Be it known that we, CLOYD F. ANDERSON and WILLIAM C. ANDERSON, citizens of the United States, residing at Denver, in the county of Denver and State of Colorado, have invented certain new and useful Improvements in Coffee-Percolators, of which the following is a specification, reference being had to the accompanying drawings.

This invention relates to improvements in percolators adapted for use in ordinary coffee pots, and an object thereof is the provision of an improved percolator which is extremely simple and efficient in operation, and which is adapted to stand upright in a coffee pot of any diameter without the aid of supports.

A further object of this invention is the provision of a percolator which is adapted for use in an ordinary coffee pot, and in which coffee is percolated without the aid of moving parts.

Still another object of this invention is the provision of a percolator comprising a percolating tube which is provided with an inverted dish-shaped foot, the upper end of the tube having a cap connected thereto in which an inverted cup is mounted, the edge of the cup being corrugated to a height above the edge of the cap, and the upper end of the tube being provided with a plurality of openings through which the fluid passes into the coffee, whereby the fluid after passing through the coffee passes between the wall of the cap and the wall of the cup so that a quantity of the essence of the coffee is always maintained within the percolator, and this essence will be gradually forced over the edge of the cap to the bottom of the coffee pot, whereby the time necessary to make the coffee is reduced.

With these and other objects in view, our invention consists in the novel construction, combination and arrangement of parts, to be hereinafter more fully described, claimed and illustrated in the accompanying drawing, in which—

Figure 1 is a vertical section of a percolator constructed in accordance with an embodiment of our invention and in applied position showing a coffee pot in dotted lines; Fig. 2 is a sectional view on the line 2—2 of Fig. 1, looking in the direction of the arrow; Fig. 3 is a sectional view on the line 3—3 of Fig. 1, looking in the direction of the arrow, and Fig. 4 is a top plan view of the percolator as herein disclosed.

Referring more particularly to the drawing, the letter A designates a coffee pot of the general construction which is provided with a cover A' and the letter B designates generally the improved percolator. The percolator comprises a vertical tube 5 which is provided at its lower end with an inverted dish-shaped disk or foot 6, the upper end of the tube being closed and being provided at its closed end with a plurality of vertical and circumferentially spaced openings 7. Connected to the periphery of the tube 5 below the openings 7 is a steeping receptacle 8 which is provided with an upstanding annular wall 9, the base of said receptacle being provided with a plurality of spaced beads 10. An inverted cup 11 is seated within the receptacle 8, the edge of the wall 12 of the cup resting upon the beads 10, whereby the edge of the cup is spaced from the base of the receptacle. The cup 11 entirely surrounds the upper end of the tube 5, and the lower edge of the cup is provided with vertical corrugations 13 which frictionally engage the inner face of the wall 9, thereby providing the spaces 14 between the wall of the cup and the wall of the receptacle. The corrugations 13 extend slightly above the edge of the wall 9, whereby the spaces 14 establish communication between the interior of the cup and the pot. The cup 11 is provided with a suitable handle 15 by means of which the percolator may be carried, and the cup 11 fits sufficiently tight into the receptacle 8 so as to enable the percolator to be disposed within and lifted from the coffee pot by the handle 15 without separation of the parts. The tube 5 is provided slightly above the disk or foot 6 with openings 16 through which liquid contained within the coffee pot is adapted to pass within the tube. The cup 11 is provided with a plurality of perforations 17 through which excess steam is adapted to pass so as not to retard the column of water as it rises in the tube 5, and the bottom of the receptacle is provided with a plurality of openings 18 which serve as drains.

In the practical use of the percolator, the cup 11 is removed from the receptacle and turned up so that ground coffee may be placed therein, whereupon the receptacle 8 to which the tube 5 is secured, is placed over the cup so that the edge of the wall 12 thereof engages the beads 10. The position of the percolator is then reversed and it is placed in the coffee pot so that the disk 6 rests upon the bottom thereof, and the desired amount of water is placed in the pot. As the water boils, steam collected by the disk 6 forces the water from its level in the tube 5 upwardly against the closed upper end thereof, whereupon it is forced through the openings 7 so that it is sprayed through the coffee contained in the cup 11. When the coffee gets thoroughly saturated, the essence thereof seeps downwardly to the bottom of the receptacle, and as the perforations or openings 18 in the receptacle are insufficient in number to allow the escape of all the essence it will rise in the wall of the cup until it reaches the upper edge of the wall 9, whereupon it will overflow into the coffee pot. As the essence is retained in the receptacle for a short time before it is discharged into the pot, it is considerably strengthened whereby the length of time necessary to make the coffee is reduced. When the coffee has been sufficiently boiled, the essence remaining in the receptacle drains through the openings 18 into the coffee pot.

What we claim is:

1. A percolator comprising a tube, a receptacle provided with an upstanding wall and connected to said tube below its upper end, said tube being formed with a plurality of perforations above said receptacle, an inverted cup provided with a wall disposed within said receptacle, means for spacing the lower edge of said cup from the bottom of said receptacle, said cup having corrugations formed on its wall and extending from its upper edge to a point above the receptacle, said receptacle and cup being substantially imperforate, the base of the receptacle being provided with a plurality of restricted openings.

2. A percolator comprising a tube, a receptacle provided with an upstanding wall and connected to said tube below its upper end, said tube having a plurality of vertical and circumferentially spaced openings formed therein above said receptacle, an inverted cup provided with a wall mounted in said receptacle and entirely surrounding the upper end of said tube, the wall of said cup frictionally engaging the wall of said receptacle and the wall of said cup being provided with a plurality of corrugations extending from its free edge to a point above the free edge of the wall of the receptacle, said receptacle and cup being substantially imperforate, the base of the receptacle being provided with a plurality of restricted openings.

3. A percolator comprising a tube, a receptacle provided with an upstanding wall and connected to said tube below its upper end, said tube having a plurality of openings formed therein above said receptacle, an inverted cup provided with a wall disposed in said receptacle and surrounding the upper end of said tube, the wall of said cup frictionally engaging the wall of said receptacle, and means for spacing the wall of said cup from the wall of said receptacle at intervals, said receptacle and cup being substantially imperforate, the base of the receptacle being provided with a plurality of restricted openings.

4. A percolator comprising a tube, a supporting disk connected to the lower end of said tube, a cup connected to said tube below its upper end, said tube having a plurality of openings therein above said cup, an inverted cup provided with a wall connected to said receptacle entirely surrounding the upper end of said tube, said tube having openings therein adjacent said disk, and means for spacing the wall of said cup from the wall of said receptacle at intervals, said receptacle and cup being substantially imperforate, the base of the receptacle being provided with a plurality of restricted openings.

In testimony whereof we hereunto affix our signatures in the presence of two witnesses.

CLOYD F. ANDERSON.
WILLIAM C. ANDERSON.

Witnesses:
W. W. ANDERSON,
J. T. MALEY.